United States Patent [19]

White

[11] Patent Number: 5,188,327
[45] Date of Patent: Feb. 23, 1993

[54] HOLDER FOR ATTENDANT SIGNALLING DEVICE

[76] Inventor: Marlin S. White, 3020 Rockville Rd., Suisun City, Calif. 94585

[21] Appl. No.: 837,904

[22] Filed: Feb. 20, 1992

[51] Int. Cl.$^5$ ............................................. A47B 96/06
[52] U.S. Cl. ................................ 248/231.8; 248/314
[58] Field of Search ............ 248/231.8, 51, 70, 231.7, 248/314, 309.1; 5/503.1, 658

[56] References Cited

U.S. PATENT DOCUMENTS

| | | | |
|---|---|---|---|
| 2,144,272 | 1/1939 | Ray | 248/51 |
| 2,253,847 | 8/1941 | Crum | 248/231.8 |
| 2,471,825 | 5/1949 | Long | 248/314 |
| 2,913,740 | 11/1959 | Eldridge | 5/503.1 |
| 3,452,955 | 7/1969 | Hartwig . | |
| 3,491,412 | 1/1970 | Johnson | 5/658 X |
| 3,747,166 | 7/1973 | Eross . | |
| 3,881,677 | 5/1975 | Ihlenfeld . | |
| 3,907,239 | 9/1975 | Ehrlich . | |
| 4,023,757 | 5/1977 | Allard | 248/231.7 X |
| 4,040,547 | 8/1977 | Dickey . | |
| 4,121,798 | 10/1978 | Schumacher et al. . | |
| 4,193,572 | 3/1980 | Horiuchi | 248/231.8 X |
| 4,213,649 | 7/1980 | Sell | 248/231.8 X |
| 4,320,832 | 3/1982 | Edstrom . | |
| 4,431,154 | 2/1984 | Hamm . | |
| 4,612,679 | 9/1986 | Mitchell | 5/658 X |
| 4,672,703 | 6/1987 | Frazier . | |
| 4,702,443 | 10/1987 | Callaway | 248/51 |

*Primary Examiner*—J. Franklin Foss
*Attorney, Agent, or Firm*—Thomas R. Lampe

[57] ABSTRACT

Holder apparatus independently mountable on the rail of a bed for releasably holding a patient communication device. The holder apparatus includes a housing having a passageway extending between its upper and lower ends. A protrusion extends from the housing into the passageway at a location between the upper and lower ends to hold communication devices which are too small to be held in position at the holder upper end.

4 Claims, 1 Drawing Sheet

HOLDER FOR ATTENDANT SIGNALLING DEVICE

TECHNICAL FIELD

This invention relates to a holder for an attendant signalling device. More particularly, the holder apparatus is for the purpose of releasably holding a patient communication device. The holder is releasably mountable on the rail of a bed so that the bed occupant can have ready access to the communication device.

BACKGROUND ART

Applicant is aware of the following U.S. Pat. Nos., all of which relate to holder constructions of various types: 3,452,955, issued Jul. 1, 1969, 4,121,798, issued Oct. 24, 1978, 4,320,832, issued Mar. 23, 1982, 3,747,166, issued Jul. 24, 1973, 3,881,677, issued May 6, 1975, 3,907,239, issued Sep. 23, 1975, 4,040,547, issued Aug. 9, 1977, 4,672,703, issued Jun. 16, 1987, and 4,431,154, issued Feb. 14, 1984.

Some of the afore-referenced patents are worthy of comment. U.S. Pat. No. 4,672,703 discloses an apparatus for positioning control devices near a bed. The apparatus comprises an open framework constructed of metal wire which is shaped and fabricated to accommodate television control devices, call buttons and the like.

While the patent teaches the idea of dipping the framework to provide a vinyl coating for the wire, it will be appreciated that normal wear and tear caused by removal and replacement of the devices which the framework is designed to hold will inevitably cause the metal wire to be exposed, thus creating an electrical hazard. Furthermore, the framework of this patent defines compartments which do not readily lend themselves to use with other than one specific size of electrical device. Patient communication devices, for example, do not have communicator body standardized sizes. With an open framework of the type shown in U.S. Pat. No. 4,672,703, various sized communicator bodies might very well fall out.

U.S. Pat. No. 4,431,154 discloses communication device holders which suffer from similar deficiencies. That is, they do not readily lend themselves to accommodation of communicator bodies of various sizes. Furthermore, there is no specific teaching of employing a holder housing which is formed of electrically non-conductive material. As stated above, metal and other electrically conductive materials are not suitable for such purpose because of the danger of a direct connection between the bed rail in the case of a short in the wiring. Heart patients, for example, could be seriously injured or even killed by even minor electrical shock.

The other patents noted above are of even less pertinence to the present invention. Employment of such devices would appear to constitute little if any improvement over the jury-rigged arrangements commonly used in hospitals and rest homes involving the tieing of communicator cords to bed frames. Safety of the holder along with convenience of utilizing the holder and allowing ready access by the patient are probably the two primary considerations when dealing with patient communication devices. The arrangements of all of the patents set forth above are deficient to at least some degree in this regard.

DISCLOSURE OF INVENTION

The present invention relates to a holder apparatus simple and inexpensive in construction which at the same time affords the desired safety and convenience of use that are imperative concerns when dealing with patient communication devices. In addition, the holder apparatus of the present invention is so designed as to accommodate various sized communicator bodies.

The holder apparatus of the present invention is independently releasably mountable on a rail of a bed for releasably holding a patient communication device having a communicator body, a call button, and an electric cord extending from the bottom of the communicator body.

The holder apparatus includes a housing having upper and lower ends, the housing being formed of electrically non-conductive material and including first and second wall elements defining a passageway extending between the upper and lower ends.

The first and second wall elements each have a distal end and the wall element distal ends are spaced from one another, are positioned in a common plane, and define a slot extending along the length of the housing between the upper and lower ends thereof and being in communication with the passageway.

The housing is of a size and configuration to support the communicator body with a portion of the communicator body suspended within the passageway. The slot has sufficient width to allow for the free passage of the electric cord therethrough when a communication device is being positioned in the holder apparatus or being removed therefrom.

The holder apparatus also includes mounting means connected to the housing and extending outwardly therefrom. The mounting means comprises a pair of resilient clamp members defining an opening for receiving a bed rail. The opening is smaller than the bed rail whereby the resilient clamp members are temporarily deformable by the bed rail when the holder apparatus is being mounted on or removed from the bed rail.

The holder apparatus additionally comprises a protrusion in a form of a rib extending at least partially about the inner periphery of each of the wall elements. The rib has an upper support surface engageable by the communicator body of a patient communicator device having a communicator body which is too small to be supported by the upper end of the housing.

The holder apparatus, when attached to a bed within reach of a patient, allows the patient, who might otherwise be unable to grasp or hold the communication device because of physical disability or impairment, to actuate the communication device quite readily while it is in the holder apparatus, as for example, by engaging the actuator button with the back of the hand, a finger, a foot, or any other body member, without actually removing the communication device.

Other features, advantages, and objects of the present invention will become apparent with reference to the following description and accompanying drawings.

BEST MODE FOR CARRYING OUT THE INVENTION

Figure 1:
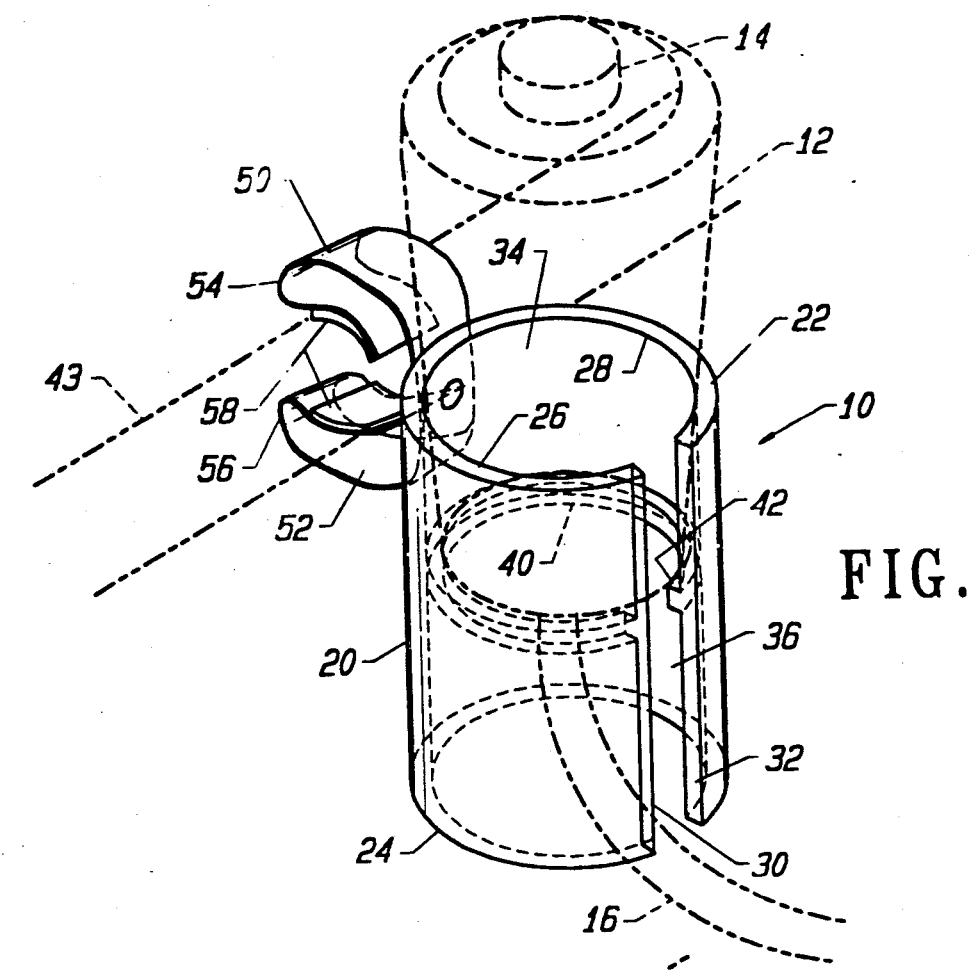
FIG. 1 is a perspective view of apparatus constructed in accordance with the teachings of the present invention and illustrating the apparatus employed with a bed rail (shown in phantom) and holding a patient communication device (also depicted in phantom)

Referring now to FIG. 1, such FIGURE illustrates a first embodiment of apparatus constructed in accordance with the present invention. The apparatus, which is generally designated by reference numeral 10, is for the purpose of releasably holding a patient communication device having a communicator body 12, a call button 14, and an electric cord 16 extending from the bottom of the communicator body. In the arrangement illustrated, the communicator body has a generally circular cross-sectional configuration as taken along the horizontal as viewed in FIG. 1.

The holder apparatus 10 includes a housing 20 also having a generally circular cross-sectional configuration as taken along the horizontal. The housing 20 has an upper end 22 and a lower end 24. The housing is formed of electrically non-conducting material such as plastic, and when such material is utilized the housing may be formed by injection molding techniques. Housing 20 has a generally tubular configuration and has first and second wall elements 26, 28 which are in a common plane at their distal ends 30, 32, respectively. The wall elements define a passageway 34 extending between the upper and lower ends. The distal ends 30, 32 are spaced from one another and define a slot 36 extending along the length of the housing between the upper and lower ends thereof. The slot 36 is in communication with the passageway.

Housing 20 is of a size and configuration to support communicator body 12 with a portion of the communicator body 12 suspended within the passageway. The illustrated communicator body 12 has a relatively large dimension which results in same engaging and being supported by the housing upper end 22. When the communication device is being held, the electric cord 16 depends downwardly through the open lower end of the housing. Access to the communication device is obtained simply by grasping the communicator body, pulling it upwardly out of engagement with the holder, and pulling it away from the holder, the electric cord 16 passing through the slot 36. The communication device is returned to the holder by reversing such steps.

An important aspect of the present invention resides in the incorporation therein of a rib 40 which extends into passageway 34 at a location between the housing upper and lower ends. The rib is preferably integrally formed with the housing.

Rib 40 comprises an alternative support for a smaller sized communicator body, i.e. a communicator body which is too small to engage and be supported by the housing upper end 22. The smaller communicator body will engage and be supported by upper support surface 42 of the rib. In any event, it will be appreciated that the entire housing and the rib are formed of electrically non-conductive material so that there is never any danger that an electrical connection will be made between the communication device and the bedframe 43 to which the holder apparatus is releasably attached.

The holder apparatus also includes mounting means connected to the housing and extending outwardly therefrom. More particularly, the mounting means comprises a pair of resilient clamp members 50, 52 affixed in any desired manner to the housing 20. For example, a rivet or other mechanical fastener may be utilized, or the mounting means may be integrally formed with the housing if the clamp members are also of plastic construction. The preferable approach, however, is to employ clamp members 50, 52 constructed of spring steel or the like which has the merit of allowing repeated use over a long period of time without failure. Each of the clamp members 50, 52 includes a distal end (54, 56) which is bent to facilitate both placement and removal of the holder apparatus with respect to a bed rail or other support object. If the clamp members are constructed of spring steel, it is preferred that padding 58 formed of rubber or other suitable material be located at the inner surfaces of the clamp members to avoid scratching or marring of the bed rail or other object to which the holder apparatus is releasably mounted.

Figure 2:
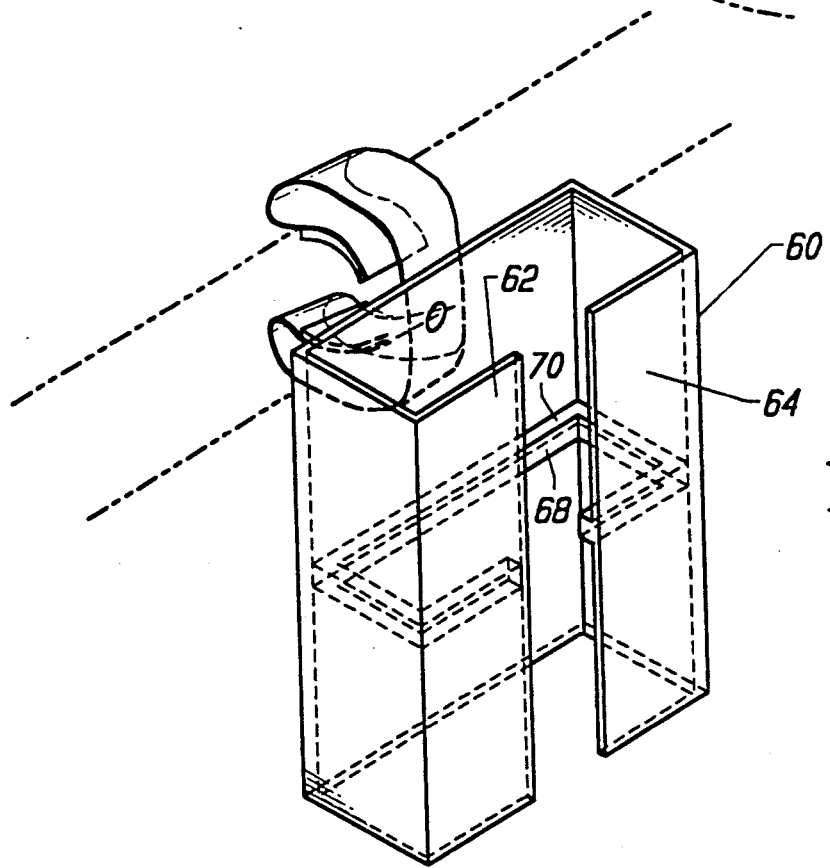
FIG. 2 is a perspective view of an alternative form of apparatus constructed in accordance with the teachings of the present invention.

Referring now to FIG. 2, an alternative form of apparatus is disclosed. In this alternative form, the housing 60 has a generally rectangular cross-sectional configuration as taken along a horizontal plane. In this embodiment the first and second wall elements 62, 64 are planar, as compared to the curved first and second wall elements of the first embodiment described above.

Housing 60 is, of course, for the purpose of releasably holding communicator bodies having a generally rectangular cross-section.

A rib 68 extends along the inner periphery of the housing 60 and projects into the passageway defined thereby, such rib having an upper support surface 70 engageable by a communicator body smaller than that which would engage the upper end of housing 60.

I claim:

1. Holder apparatus independently releasably mountable on the rail of a bed for releasably holding a patient communication device having a communicator body, a call button, and an electric cord extending from the bottom of the communicator body, said apparatus comprising, in combination:

a housing having upper and lower ends, said housing being wholly formed of electrically non-conductive plastic material and including first and second wall elements defining a passageway extending between said upper and lower ends, said wall element first and second wall elements each having a distal end, said distal ends being spaced from one another, positioned in a common plane, and defining a slot extending along the length of said housing between the upper and lower ends thereof and being in communication with said passageway, said housing being of a size and configuration to support said communicator body with a portion of said communicator body suspended within said passageway, said slot having sufficient width to allow for the free passage of said electric cord therethrough when the communication device is being positioned in said holder apparatus or being removed therefrom; and mounting means connected to said housing and extending outwardly therefrom, said mounting means comprising a pair of resilient clamp members defining an opening for receiving a bed rail, said opening being smaller than said bed rail whereby said resilient clamp members are temporarily deformed by said bed rail when said holder apparatus is being mounted on or removed from said bed rail, said housing additionally comprising a protrusion extending from at least one of said wall elements into said passageway at a location between said housing upper and lower ends, said protrusion and said housing upper end comprising alternative supports for different sized communicator bodies, said protrusion comprising a rib extending substantially about the inner periphery of each of said wall elements, said rib having an upper support surface engageable by the communicator body of a patient communicator device having a communicator body which is too small to be supported by the upper end of said housing, and said rib being wholly formed of electrically non-conductive plastic material, extending in a plane substantially perpendicular to said common plane, and having opposed rib ends terminating at said slot.

2. The holder apparatus according to claim 1 wherein said housing wall elements define an inner surface which defines a partial circle and said rib extends the combined lengths of said wall elements.

3. The holder apparatus according to claim 1 wherein said housing wall elements define an inner surface which defines a partial rectangle and said rib extends the combined lengths of said wall elements.

4. The holder apparatus according to claim 1 wherein said housing and said rib are of integrally molded plastic construction.

* * * * *